(12) United States Patent
Ryabova

(10) Patent No.: US 10,131,793 B2
(45) Date of Patent: Nov. 20, 2018

(54) MODIFIED HYBRID SOL-GEL SOLUTIONS AND COMPOSITIONS FORMED FROM SUCH SOLUTIONS

(71) Applicant: Advenira Enterprises, Inc., Sunnyvale, CA (US)

(72) Inventor: Elmira Ryabova, Sunnyvale, CA (US)

(73) Assignee: Advenira Enterprises, Inc., Sunnyvale, CA (US)

( * ) Notice: Subject to any disclaimer, the term of this patent is extended or adjusted under 35 U.S.C. 154(b) by 1110 days.

(21) Appl. No.: 14/326,767

(22) Filed: Jul. 9, 2014

(65) Prior Publication Data

US 2014/0335275 A1    Nov. 13, 2014

Related U.S. Application Data

(63) Continuation-in-part of application No. 13/365,066, filed on Feb. 2, 2012, now abandoned.
(Continued)

(51) Int. Cl.
*C09D 1/00* (2006.01)
*C09D 5/24* (2006.01)
(Continued)

(52) U.S. Cl.
CPC ............... *C09D 1/00* (2013.01); *C09D 5/24* (2013.01); *C23C 18/122* (2013.01);
(Continued)

(58) Field of Classification Search
None
See application file for complete search history.

(56) References Cited

U.S. PATENT DOCUMENTS 5,944,866 A    8/1999  Chen et al.
6,403,161 B1   6/2002  Lobmann et al.
(Continued)

FOREIGN PATENT DOCUMENTS

AU    2012212134    1/2017
CA     2825214      7/2017
(Continued)

OTHER PUBLICATIONS

"Russian Application Serial No. 2013140463, Office Action dated Jan. 27, 2016", 8 pgs.
(Continued)

*Primary Examiner* — Shamim Ahmed
*Assistant Examiner* — Bradford M Gates
(74) *Attorney, Agent, or Firm* — Kwan & Olynick LLP

(57) ABSTRACT

Provided are modified hybrid sol-gel precursor solutions and coatings formed from such solutions. A modified hybrid sol-gel precursor solution includes an inorganic precursor, cross-linkable inorganic-organic precursor, cross-linkable organic precursor, protic solvent, and aprotic solvent. The inorganic precursor may include a metal or metalloid and two or more hydrolysable groups. The cross-linkable inorganic-organic precursor may include a metal, hydrolysable group, and organic molecule. The cross-linkable organic precursor has another organic molecule with two or more second cross-linking groups. A combination of protic and aprotic solvents in the same solution may be used to control properties of the solutions, thermodynamics, and other processing aspects. The solution may also include nanoparticles. The nanoparticles may include functionalized surface to form covalent bonds with one or more precursors of the solution, such as a plasma treated surface. The nanoparticles may be sized to fit into the sol-gel network without substantially disturbing this network.

18 Claims, 3 Drawing Sheets

Related U.S. Application Data

(60) Provisional application No. 61/844,714, filed on Jul. 10, 2013, provisional application No. 61/438,862, filed on Feb. 2, 2011.

(51) Int. Cl.
  *C23C 18/12* (2006.01)
  *H01J 1/70* (2006.01)
  *C23C 18/04* (2006.01)

(52) U.S. Cl.
  CPC ........ *C23C 18/127* (2013.01); *C23C 18/1216* (2013.01); *C23C 18/1233* (2013.01); *C23C 18/1245* (2013.01); *C23C 18/1254* (2013.01); *C23C 18/1295* (2013.01); *H01J 1/70* (2013.01); *C23C 18/04* (2013.01)

(56) References Cited

U.S. PATENT DOCUMENTS

| | | | |
|---|---|---|---|
| 7,745,010 | B2 * | 6/2010 | Schneider .............. B82Y 30/00 252/388 |
| 2003/0175411 | A1 | 9/2003 | Kodas et al. |
| 2004/0247899 | A1 | 12/2004 | Bier et al. |
| 2007/0065660 | A1 * | 3/2007 | Okamoto .................. C09D 5/24 428/328 |
| 2007/0135565 | A1 | 6/2007 | Ogihara et al. |
| 2008/0193746 | A1 | 8/2008 | Beaurain et al. |
| 2008/0213598 | A1 * | 9/2008 | Papendick ............ B05D 3/0254 428/418 |
| 2010/0089451 | A1 * | 4/2010 | Harimoto ............... C08G 77/12 136/261 |
| 2010/0105549 | A1 | 4/2010 | Chung et al. |
| 2011/0086234 | A1 * | 4/2011 | Stasko ...................... C09D 5/08 428/447 |
| 2011/0184139 | A1 | 7/2011 | Malik et al. |
| 2012/0202037 | A1 | 8/2012 | Ryabova |

FOREIGN PATENT DOCUMENTS

| | | |
|---|---|---|
| CN | 103717785 A | 4/2014 |
| CN | ZL201280007548.8 | 3/2017 |
| DE | 19943789 A1 | 3/2001 |
| EP | 2670885 A2 | 12/2013 |
| HK | 1187382 A | 4/2014 |
| JP | S59155038 A | 9/1984 |
| JP | H05247657 A | 9/1993 |
| JP | 2009270144 A | 11/2009 |
| JP | 5990541 | 8/2016 |
| KR | 10-1735879 | 5/2017 |
| RU | 2013140463 A | 3/2015 |
| RU | 2590434 | 6/2016 |
| TW | 201244812 A | 11/2012 |
| TW | I558453 | 11/2016 |
| WO | 2010059174 A1 | 5/2010 |
| WO | 2010135622 A1 | 11/2010 |
| WO | 2012106532 A2 | 8/2012 |

OTHER PUBLICATIONS

"Int'l Application Serial No. PCT/US2012/023660, Preliminary Report on Patentability dated Nov. 21, 2013", 13 pgs.

"Int'l Application Serial No. PCT/US2012/023660, Search Report dated Oct. 10, 2013", 7 pgs.

Liu, Meng-Yueh et al., "Effect of Solvent on Morphological Properties of TiOx Thin Film", Proceedings of SPIE, vol. 7396, Aug. 20, 2009, pp. 73960U-73960U-7.

Movchan, T G. et al., "Kinetics of Structuring in the Sol-Gel Systems Based on Tetraethoxysilane with Organic Additives: I. Sols", Glass Physics and Chemistry, Kluwer Academic Publishers-Plenum Publishers, NE, vol. 31, No. 2, Mar. 2005, pp. 219-228.

Nass, Rudiger et al., "Modelling of Ormocer Coatings by Processing", (Journal of Non-Crystalline Solids, vol. 121, Issues 1-3, May 1990, pp. 370-374.

Ranjit, Koodali T. et al., "A Review of the Chemical Manipulation of Nanomaterials Using Solvents: Gelatin Dependent Structures", Journal of Sol-Gel Science and Technology, Kluwer Academic Publishers, vol. 40, No. 2-3, Jun. 27, 2006, pp. 335-339.

Schottner, Gerhard , "Hybrid Sol-Gel-Derived Polymers: Applications of Multifunctional Materials",, Chem Mater., vol. 13,, 2001, 3422-3435.

Srinivasa, R R. et al., "Rheology of Silica Dispersions in Organic Liquids: New Evidence for Solvation Forces Dictated by Hydrogen Bonding", Langmuir, vol. 16, No. 21, Oct. 2000, pp. 7920-7930.

Wengui, Weng et al., "Control of Gel Morphology and Properties of a Class of Metallo-Supramolecular Polymers by Good/Poor Solvent Environments", Macromolecules, vol. 42, No. 1, Apr. 12, 2008, pp. 236-246.

Wolf, C et al., "Sol-Gel Formation of Zirconia: Preparation, Structure and Rheology of Sols", Journal of Materials Science, Kluwer Academic Publishers, vol. 27, No. 14, Jul. 15, 1992, pp. 3749-3755.

Young, Sil L. et al., "Dynamic Properties of Shear Thickening Colloidal Suspensions", Rheologica Acta, vol. 42, No. 3, May 2003, pp. 199-208.

Zerda, T W. et al., "Effect of Solvents on the Hydrolysis Reaction of Tetramethyl Orthosilicate", Chemistry of Materials, vol. 2, No. 4, Jul. 1990, pp. 372-376.

"U.S. Appl. No. 13/365,066, Non Final Office Action dated Nov. 2, 2016", 11 pages.

"Chinese Application Serial No. 201280007548.8, Notice of Allowance dated Jan. 3, 2017", 5 pgs.

"Chinese Application Serial No. 201280007548.8, Office Action dated Jul. 6, 2016", 8 pgs.

"Korean Application Serial No. 10-2013-7022710, Office Action dated Feb. 10, 2017", 7 pgs.

"U.S. Appl. No. 13/365,066, Final Office Action dated Nov. 27, 2015", 8 pgs.

"U.S. Appl. No. 13/365,066, Non Final Office Action dated Jun. 1, 2015", 13 pgs.

"Chinese Application Serial No. 201280007548.8, Office Action dated Feb. 28, 2015", 9 pgs.

"Chinese Application Serial No. 201280007548.8, Office Action dated Nov. 10, 2015", 8 pgs.

"Japanese Application Serial No. 2013-552633, Office Action dated Jan. 20, 2016", 20 pgs.

"Taiwan Application Serial No. 101103384, Office Action dated Jul. 23, 2015", 13 pgs.

Liu, Meng-Yueh et al., "Effect of solvent on morphological properties of TiOx thin film", Proc. of SPIE, vol. 7396, Sections 2.1 and 2.2 on p. 2, 2009, 2 pgs.Feb. 11, 2016.

* cited by examiner

MODIFIED HYBRID SOL-GEL SOLUTIONS AND COMPOSITIONS FORMED FROM SUCH SOLUTIONS

CROSS-REFERENCE TO RELATED APPLICATIONS

This application claims the benefit of U.S. Provisional Patent Application 61/844,714, entitled: "Modified Hybrid Sol-Gel Compositions," filed on Jul. 10, 2013, which is incorporated herein by reference in its entirety. This application is also a continuation-in-part application of a co-pending application U.S. Ser. No. 13/365,066 entitled "Solution Derived Nanocomposite Precursor Solutions, Methods for Making Thin Films and Thin Films Made by Such Methods," filed on Feb. 2, 2012, which claims the benefit of U.S. 61/438,862 entitled "Solution Derived Nanocomposite Precursor Solutions and Methods for Making Thin Films," filed Feb. 2, 2011. Both U.S. Ser. No. 13/365,066 and U.S. 61/438,862 are incorporated herein by reference in their entirety.

TECHNICAL FIELD

Modified hybrid sol-gel solutions and modified hybrid sol-gel compositions, such as thin films, formed from the modified hybrid sol-gel solutions are disclosed herein. In these solutions and composition the organic content and cross-linking mechanism are modified by the addition of cross-linkable organic-inorganic precursors and cross-linkable organic precursors.

BACKGROUND

Sol-gel technology has been extensively studied for many years. Various sol-gel methods are typically used to fabricate metal oxides, especially silicon oxides and titanium oxides. The process involves conversion of monomers into a colloidal solution (sol) that acts as the precursor for an integrated network (or gel) of either discrete particles or network polymers. Typical precursors are inorganic materials, such as metal alkoxides.

A common issue of sol-gel process derived inorganic material coatings is brittleness that causes cracking of sol-gel coatings. Inorganic-organic hybrid sol-gel systems have been proposed to address the issue. However, the proposed systems have not been adopted because of various difficulties in using these systems, e.g., premature gelation, incomplete curing, and the like. Yet, these hybrid inorganic-organic systems allow exploring new applications, such as antireflection coating for CR-39 based lens, medical technology, dental materials, and the like.

Hybrid sol-gel materials can be divided into two classes. The first class is based on organic molecules, prepolymers, or polymers embedded in an inorganic matrix. The second class is based on inorganic and organic components connected by covalent bonds. The presence of covalent bonds translates into various unique properties in the second class hybrid sol-gel materials. These covalent bonds can be formed by UV induced polymerization or as a product of the specific reaction. This disclosure relates primarily to the second class of hybrid sol-gel materials in which inorganic and organic components connected by covalent bonds.

Inorganic precursors of hybrid sol-gel compositions may include metal salts and metal alkoxides, such as set forth in the following formula:

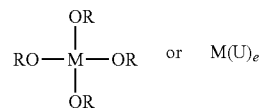

The organic precursors can be an organic precursor or an inorganic-organic precursor as set forth in the following formulas, where R is an organic radical covalently bonded to Si:

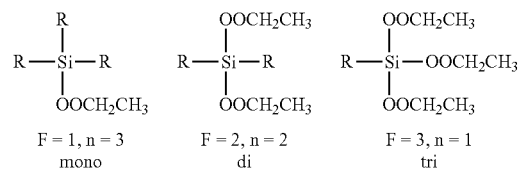

The inorganic and organic precursors are typically combined and exposed to a catalyst to induce formation of the hybrid sol-gel.

SUMMARY

Provided are modified hybrid sol-gel precursor solutions and coatings formed from such solutions. A modified hybrid sol-gel precursor solution includes an inorganic precursor, cross-linkable inorganic-organic precursor, cross-linkable organic precursor, protic solvent, and aprotic solvent. The inorganic precursor may include a metal or metalloid and two or more hydrolysable groups. The cross-linkable inorganic-organic precursor may include a metal, hydrolysable group, and organic molecule. The cross-linkable organic precursor has another organic molecule with two or more second cross-linking groups. A combination of protic and aprotic solvents in the same solution may be used to control properties of the solutions, thermodynamics, and other processing aspects. The solution may also include nanoparticles. The nanoparticles may include functionalized surface to form covalent bonds with one or more precursors of the solution, such as a plasma treated surface. The nanoparticles may be sized to fit into the sol-gel network without substantially disturbing this network.

In some embodiments, the inorganic precursor, which may be referred to as Precursor A comprises a metal or metalloid covalently bonded to two or more hydrolysable groups e.g. alkoxide, halides, carbonates sulfates, phosphates, acetates and hydroxide.

In some embodiments, the cross-linkable inorganic-organic precursor, which may be referred to as Precursor B, comprises to a metal or a metalloid covalently bonded to (1) one or more hydrolysable groups and (2) at least one organic molecule via a covalent bond. The covalent bond may be hydrolytically stable under the conditions required for sol-gel formation (i.e., hydrolysis and condensation). This stability may be ensured by relative amounts of protic and aprotic solvents. The at least one organic molecule may include at least one cross linking group.

In some embodiments, the cross-linkable organic precursor, which may be referred to as Precursor C, comprises an organic molecule with two or more cross linking groups. The cross linking groups can be the same or different.

The inorganic precursor A can be represented by structural Formula (I):

$$M\text{-}(O\text{—}R^1)_e \text{ or } M(U)_e \tag{I}$$

where
M is the first metal or the first metalloid;
(O—$R^1$) or U is one of the two or more first hydrolysable groups such that
e is 2-6,
O is oxygen,
$R^1$ is alkyl, substituted alkyl, or heteroalkyl, and
U is one of Cl$^-$, Br$^-$, NO$_3^-$, CO$_3^{2-}$, SO$_4^{2-}$, PO$_4^{3-}$, CH$_3$COOO$^-$, OH$^-$ C(H$_2$)C(Me)COO$^-$, C(H$_2$)C(H)COO$^-$, CH$_3$SO$_3^-$, CF$_3$SO$_3^-$, CF$_3$COO$^-$, and CH$_3$C$_6$H$_4$SO$_3^-$.

While in some cases this inorganic precursor can contain an organic portion, such as alkoxide, it is referred to as an inorganic precursor because during sol-gel formation, the organic portion of the molecule (if present) is, for the most part, hydrolyzed from the precursor and does not form a part of the resulting sol-gel composition.

The cross-linkable inorganic-organic precursor B can be represented by structural Formula (II):

$$-(U\text{-}L_1)_f\text{-}M'\text{-}(O\text{—}R^2)_g- \tag{II}$$

where O is oxygen;
where
M' is the second metal selected from the group consisting of Si, Ge, and Sn,
(U-L$_1$) is the first organic molecule such that
f is 1 or 2,
U is the first cross-linking group, and
L1 is one of alkyldiyl, substituted alkydiyl, fluoroalkydiyl or heteroalkydiyl,
(O—$R^2$) is the second hydrolysable group such that
g is 2-5,
O is oxygen, and
$R^2$ is a alkyl, substituted alkyl or heteroalkyl.

The cross-linkable organic precursor C can be represented by structural Formula (III):

$$-V\text{-}L_2\text{-}(V)_h- \tag{III}$$

where
V-L$_2$-(V)$_h$ is the second organic molecule,
L$_2$ is one of alkyl, substituted alky, heteroalkyl, cycloalkyl, silsesquioxane, or polydimethysiloxane,
V is one of the two or more second cross-linking groups such that h is 1-7.

Precursors A, B and C are combined together with a protic solvent and aprotic solvent or, more specifically, a polar protic solvent and polar aprotic solvent. The polarity of the solvents may be characterized by their dielectric constant. In some embodiments, the dielectric constant of each of the protic solvent and aprotic solvent used in a modified hybrid sol-gel precursor solution is at least about 15. Some suitable examples of polar protic solvents include water, propanol, ethanol, and forming acid. Some suitable examples of polar aprotic solvents include acetone, dimethylformamide (DMF), acetonitrile (MeCN), and dimethyl sulfoxide (DMSO). Without being restricted to any particular theory, it is believed that inorganic gel formation is facilitated by the use of certain combinations of polar protic and polar aprotic solvents as further described below. In some embodiments, a polar protic solvent is also combined with a non-polar protic solvent (i.e., a solvent having a dielectric constant of less than about 15). In some embodiments, a non-polar aprotic solvent is used as well.

In some embodiments, the modified hybrid sol-gel precursor solution also includes a catalyst to induce sol-gel formation. An acid or base catalyst may be used. In some embodiments, a catalyst is a metal catalyst, such as platinum. The choice of catalyst generally depends on the first and second cross-linking groups in precursors B and C.

In some embodiments, the modified hybrid sol-gel precursor solution also includes a polymerization agent that induces covalent bond formation via the cross linking groups. The polymerization agent should be distinguished from polymerization a catalyst. The catalyst is responsible for lowering activation energy and therefore starting the reaction of gelation. As such, the catalyst is mainly responsible for changing kinetics of the polymerization reaction. A catalyst may be an acid, such as acetic acid. The polymerization agent is responsible for thermodynamic balance. Some examples of suitable polymerization agents include trimethoxysilanes, such as (3-aminopropyl)trimethoxysilane, (3-mercaptopropyl)trimethoxysilane, and (3-glycidyloxypropyl)trimethoxysilane. In some embodiments, the polymerization agent is operable as a cross-linkable inorganic-organic precursor.

The composition so obtained can be represented by structural Formula (IV):

$$-(A')_a\text{—}(B')_b\text{—}(C')_c- \tag{IV}$$

where components A', B' and 'C are derived from precursors A, B and C, respectively. Each of a, b and c is a mole fractions greater than 0. The sum of a, b and c is may be least 0.5, at least about 0.8, or even about 1. When the sum is less than 1, the composition may include a filler, e.g., nanoparticles, or some other components further described below. A', B' and C' are covalently bonded to each other alternatively, randomly, or in blocks.

Component A' has structural Formula (V):

$$-(O)_d\text{-}M\text{-}(O\text{—}R^3)_e- \tag{V}$$

where
O is oxygen,
M is the first metal or the first metalloid,
$R^3$ is one of H, alkyl, substituted alkyl, or heteroalkyl;
d is 2-6; and
e is 0-4.

Component B' has structural Formula (VI):

$$-(X\text{-}L_1)_f\text{-}M'\text{-}(O\text{—}R^4)_g- \tag{VI}$$

where
M' is the second metal selected from the group consisting of Si, Ge and Sn
f is 1 or 2,
g is 2-5,
L$_1$ is one of alkyldiyl, substituted alkydiyl, fluoroalkydiyl, or heteroalkydiyl,
X is a first covalent linkage,
$R^4$ is a bond, alkyl, substituted alkyl, or heteroalkyl.

Component C' has structural Formula (VII):

$$-Z\text{-}L_2\text{-}(Z)_h- \tag{VII}$$

where h is 1-7,
L$_2$ is one of an alkyl, substituted alky, heteroalkyl, cycloalkyl, silsesquioxane, polydimethysiloxane; and
Z is one of the two or more second cross-linking groups such that h is 1-7.

The metal in precursor A may be one or more of the transition metals, lanthanides, actinides, alkaline earth metals and Group IIIA through Group VA metals or combinations thereof with another metal or metalloid. Some specific examples include the rare earth metals, Al, Sb, As, Ba, Bi, B, Cd, Ca, Cr, Co, Cu, Ga, Ge, In, Fe, Mg, Mn, Ni, Nb, Y, Se, Si, Sr, Ta, Te, Sn, Ti, W, Zn, and Zr. The metalloid in precursor A can be selected from the group consisting of boron, silicon, germanium, arsenic, antimony, tellurium, bismuth, and polonium.

In some embodiment, nanoparticles are added to form modified hybrid sol-gel precursor solutions. Specifically, nanoparticles may form a suspension or dispersion when added to precursors A, B and C and protic and aprotic solvents. The nanoparticles may be metals, oxides (e.g., silica and alumina), nitrides (e.g., aluminum nitride and silicon nitride), metal oxynitrides, metal halides, synthetic diamond, carbon nanotubes (single or multiwall), carbon nanoparticles, fullerene nanoparticles, and the like. For example, metallic nanoparticles made from aluminum, copper, gold, zinc, silver and the like and shaped as a particle (i.e., a one dimensional structure), flake (i.e., a two dimensional structure), or a wire (i.e., a one dimensional structure) may be used. The nanoparticles may have functionalized surfaces configured to form covalent bonds with one or more of the inorganic precursor, the cross-linkable inorganic-organic precursor, or the cross-linkable organic precursor. For example, nanoparticle surfaces may be plasma treated.

Methods for forming a solid thin film layer using modified hybrid sol-gel precursor solutions are also described. The method may include applying a modified hybrid sol-gel precursor solution including precursors A, B and C and protic and aprotic solvents to one or more surfaces of a substrate. The applied sol-gel precursor is then cured on the surface thereby forming the solid thin film layer. The application of the solution may involve application of a substantial shear force to the solution layer in order to cause gelation of the precursors in the solution. In some embodiments, the shear force may be applied to the solution layer after it is formed. For example, the substrate with the solution layer on its surface may be subjected to rotation and/or vibration thereby exerting centrifuge and/or inertial force on the solution layer, which translated into the shear force when the solution is forced to move on the surface.

These and other embodiments are described further below with reference to the figures.

DETAILED DESCRIPTION OF EXAMPLE EMBODIMENTS

Figure 1:
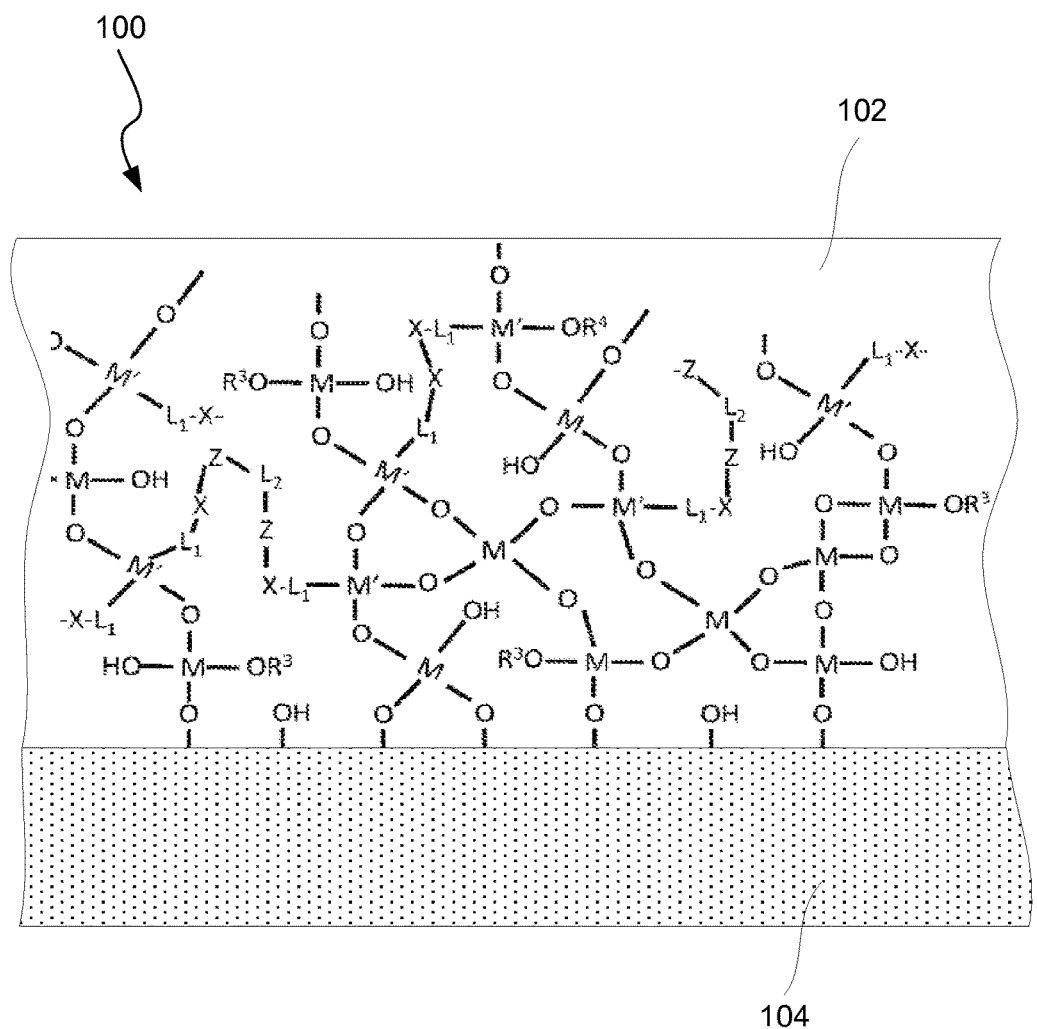
FIG. 1 depicts an assembly including a solid thin film layer formed from a modified hybrid sol-gel precursor solution and disposed on the surface of a substrate, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Modified hybrid sol-gel compositions open door to new applications, such as optional coatings and protective coatings. However, forming uniform thin film layers of hybrid sol-gel compositions have been difficulty. The difficulty appears in combining multiple different precursors in the same modified hybrid sol-gel precursor solution and maintaining this solution in a form suitable for one or more coating applications and then being able to cure this solution on the surface of the substrate. It has been found that certain amounts of protic and aprotic solvents or, more specifically, polar protic and aprotic solvents can be used to control properties of the modified hybrid sol-gel precursor solutions and make these solutions workable for various coating applications. Furthermore, these amounts may be chosen to control thermodynamic ratios of various reactions occur between precursors A, B, and C. For example, the composition may be chosen in such a way that the formation of inorganic sol-gel polymers is thermodynamically favored. Without being bound by any particular theory, it is believed that the mixture of polar protic and polar aprotic solvents results in a mixed solvent having an altered polarity (as compared to single solvent systems) that effectively lowers the activation energy of a certain reaction, e.g., polymer formation by the metal and/or metalloid precursors. If too much polar aprotic solvent is used, the modified hybrid sol-gel precursor solution may become unstable and can form a gel during its mixing or prior to its application resulting in clogging of the application equipment and/or non-uniform layers. On the other hand, if too little polar aprotic solvent is used, the applied precursor solution may not gel in a time efficient manner on the substrate surface. Protic solvents can donate hydrogen ion and create acidic environment, while aprotic solvents cannot. As such, polar protic solvents are favorable for $S_N1$ reactions (i.e., a substitution reaction), while polar aprotic solvents are favorable for $S_N2$ reactions (i.e., a nucleophilic substitution reaction). The acidity of the solution may be determined by various factors, such as precursors and solvents of the modified hybrid sol-gel precursor solution, desired processing conditions, substrate properties, and the like. For example, some substrates may need modified hybrid sol-gel precursor solutions with higher acidity than other.

Depending on precursors A, B, C and types of protic and aprotic solvents, the relative amount of the solvents may change. In some embodiments, the weight ratio of the protic solvent and the aprotic solvent is between about 1:1 to 1000:1 or, more specifically, between about 10:1 to 100:1. It should be noted that more protic solvent is used than the aprotic solvent in order to favorable for the $S_N1$ reaction. However, as noted above, the aprotic solvent is still needed for gelation. Various catalysts may also impact different reaction rates occurring modified hybrid sol-gel precursor solutions. In some embodiments, a combination of protic and aprotic solvents represents between about 50% and 95% by weight of the total modified hybrid sol-gel precursor solution or, more specifically, between about 75% and 92% by weight, or even about 90% by weight.

The modified hybrid sol-gel precursor solution may also include nanoparticles. The nanoparticles may be used to alter various properties (e.g., mechanical properties, electrical properties, optical properties) of the resulting solid thin film layer. For example, some nitride and oxide nanoparticles increase abrasion resistance and hardness, increase Young's modulus, and decrease the coefficient of thermal expansion. Metallic nanoparticles, such can aluminum, copper, gold, zinc, silver and the like, may be used to increase electrical conductivity. The nanoparticles can be functionalized, e.g., to form covalent bonds with one or more precursors in the modified hybrid sol-gel precursor solution. Furthermore, the size of the nanoparticles may be such that the nanoparticles fit into a sol-gel matrix formed by the three precursors in the sol-gel precursor solution.

Precursor Examples

The inorganic precursor (i.e., precursor A) can be represented by structural Formula (I):

$M\text{-}(O\text{—}R^1)_e$ or $M(U)_e$    (I)

where

M is the first metal or the first metalloid;

$(O\text{—}R^1)$ or U is one of the two or more first hydrolysable groups such that e is 2-6, O is oxygen, $R^1$ is one of alkyl, substituted alkyl, or heteroalkyl, and U is one of $Cl^-$, $Br^-$, $NO_3^-$, $CO_3^{2-}$, $SO_4^{2-}$, $PO_4^{3-}$, $CH_3COOO^-$, $OH^-$ $C(H_2)C(Me)COO^-$, $C(H_2)C(H)COO^-$, $CH_3SO_3^-$, $CF_3SO_3^-$, $CF_3COO^-$, and $CH_3C_6H_4SO_3^-$.

While in some embodiments, precursor A may contain an organic portion, such as alkyl or alkyl-oxide, precursor A is referred to as an inorganic precursor because during sol-gel formation, the organic portion of the molecule is, for the most part, hydrolyzed from precursor A and does not form a part of the resulting modified hybrid sol-gel composition.

The first metal in precursor A can be one or more of the transition metals, lanthanides, actinides, alkalines, earth metals, and Group IIIA through Group VA metals or combinations thereof with another metal or metalloid. Examples include the rare earth metals, Al, Sb, As, Ba, Bi, B, Cd, Ca, Cr, Co, Cu, Ga, Ge, In, Fe, Mg, Mn, Ni, Nb, Y, Se, Si, Sr, Ta, Te, Sn, Ti, W, Zn and Zr. The first metalloid in precursor A may be boron, silicon, germanium, arsenic, antimony, tellurium, bismuth, or polonium.

The cross-linkable inorganic-organic precursor B can be represented by structural Formula (II):

—$(U\text{-}L_1)_f\text{-}M'\text{-}(O\text{—}R^2)_g$—    (II)

where

M' is the second metal selected from the group consisting of Si, Ge, and Sn, $(U\text{-}L_1)$ is the first organic molecule such that f is 1 or 2, U is the first cross-linking group, and $L_1$ is one of alkyldiyl, substituted alkydiyl, fluoroalkydiyl, or heteroalkydiyl, $(O\text{—}R^2)$ is the second hydrolysable group such that g is 2-5, O is oxygen, and $R^2$ is an alkyl, substituted alkyl, or heteroalkyl.

In some embodiments, —O—$R^2$ is one of alkoxide (—O—$C_nH_{2n+1}$, n=1 to 4), alkyl acetate, alkyl acetonate, benzoyl acetonate, and alkyl dionate.

In some embodiments, $U\text{-}L_1$ is one of $C_nH_{2n+1}$ (n=1 to 20), $C_nH_{2(n-m)}F_{2m+1}$ (n=1 to 20; m=1 to 20), polydimethylsiloxane, polymethylphenylsiloane, and CnH2n-V or —[Si$(CH_3)_2O]n\text{-}V$ (n=0 to 20) where V=H (hydride), CH=$CH_2$ (vinyl), Halide (F, Cl, Sr, I), amine ($NH_2$, MeNH), mercapto (SH), epoxy (e.g., glycidoxy, epoxycyclohexyl), anhydride, acryloxy, and methacryloxy. More specifically, $L_1$ is one of —$C_nH_{2n+1}$ (n=1 to 20), —$C_nH_{2(n-m)}F_{2m+1}$ (n=1 to 20; m=1 to 20).

Specific examples of cross-linkable inorganic-organic precursors include trimethoxysilanes, such as (3-aminopropyl)trimethoxysilane, (3-mercaptopropyl)trimethoxysilane, and (3-glycidyloxypropyl)trimethoxysilane.

The cross-linkable organic precursor C can be represented by structural Formula (III):

—$V\text{-}L_2\text{-}(V)_h$—    (III)

where $V\text{-}L_2\text{-}(V)_h$ is the second organic molecule, $L_2$ is one of alkyl, substituted alky, heteroalkyl, cycloalkyl, silsesquioxane, or polydimethysiloxane, V is one of the two or more second cross-linking groups such that h is 1-7.

In some embodiments, $L_2$ is one of alkyl, cycloalkyl, alkyleneoxy, alkyl ester, silsesquioxane, polydimethysiloxane (POMS) and polymethylphenylsiloxane.

In some embodiments, $V\text{-}L_2$ is one of $C_nH_{2n+1}$ (n=1 to 20), $C_nH_{2(n-m)}F_{2m+1}$ (n=1 to 20; m=1 to 20) and $C_nH_{2n}$—V (n=0 to 6) where V=H (hydride), CH=$CH_2$ (vinyl), halide (F, Cl, Br, I), amine ($NH_2$, MeNH), mercapto (SH), epoxy (e.g., glycidoxy, epoxycyclohexyl), anhydride, acryloxy, methacryloxy, and the line.

The first and second cross-linking groups can be any group that can react with another precursor in the reaction mixture (e.g., precursor A and/or precursor B), the surface of a substrate to which the solution is applied to, and/or the surface of nanoparticles provided in the solutions. Some examples of first and second cross-linking groups include H (hydride), CH=$CH_2$ (vinyl), Halide (F, Cl, Br, I), amine ($NH_2$, MeNH), mercapto (SH), epoxy (e.g., glycidoxy, epoxycyclohexyl), anhydride, acryloxy, and methacryloxy.

The modified hybrid sol-gel composition so obtained can be represented by structural Formula (IV):

—$(A')_a$—$(B')_b$—$(C')_c$—    (IV)

A, B and C are covalently bonded to each other alternatively, randomly or in blocks. Components A', B' and C' are derived from precursors A, B and C, respectively. Letters a, b and c represent mole fractions of components A', B' and C'. The relative amounts of precursors A, B and C influence the proportions of the corresponding components A, B and C in the final product. In some embodiments, the sum of a, b and c is at least 0.5 or, more specifically, at least about 0.8 or even about 1. Besides A', B' and C', the modified hybrid sol-gel composition nanoparticles, for example.

In some embodiments, each of a, b and c is greater than 0 or, more specifically, greater than 0.1, or even greater than 0.2. For example, the mole fraction "a" of component A may be 0.2-0.8 or, more specifically, 0.4-0.7, and still more specifically 0.5-0.6. The mole fraction "b" of component B may be 0.2-0.8, more specifically 0.4-0.7 and still more specifically 0.5-0.6. The mole fraction "c" of component C may be 0.01-0.6, more specifically 0.1-0.3 and still more specifically 0.1-0.2. In general, increasing the mole fraction of component C increases the flexibility, gas and liquid permeability and hydrophobicity of the compound. The same is true when the relative amount of component B is increased but less so than for component C since B has in most cases less organic character. Relatively high amounts of component A increase the glass-like nature of the compound.

Component A' has structural Formula (V):

$$-(O)_d\text{-}M\text{-}(O-R^3)_e- \qquad (V)$$

where
O is oxygen,
M is the first metal or the first metalloid,
$R^3$ is one of H, alkyl, substituted alkyl, or heteroalkyl,
d is 2-6, and
e is 0-4.

Component B' has structural Formula (VI):

$$-(X\text{-}L_1)_f\text{-}M'\text{-}(O-R^4)_g- \qquad (VI)$$

M' is a metal selected from the group consisting of Si, Ge and Sn,
f is 1 or 2,
g is 2-5,
$L_1$ is one of alkyldiyl, substituted alkydiyl, or heteroalkydiyl,
X is a first covalent linkage,
$R^4$ is one of a bond, alkyl, substituted alkyl or heteroalkyl; and Component C' has structural Formula (VII):

$$-Z\text{-}L_2\text{-}(Z)_h- \qquad (VII)$$

where
h is 1-7,
$L_2$ is one of alkyl, substituted alky, heteroalkyl, cycloalkyl, silsesquioxane, polydimethysiloxane, and
Z is a second covalent linkage.

Examples of the covalent linkages X and Z which are formed upon polymerization of the covalent cross-linkers U and V include a bond, —O—, —N($R^5$)—, —N(H)—, —S—, —S—S—, C(O)N($R^5$)—, —N($R^5$)C(O)—, —N($R^5$)S($O_2$)—, —S(O)$_2$N($R^5$)—, —OC(O)—, —OC(O)N($R^5$)—, —N($R^5$)C(O)O—, —N($R^5$)C(O)N($R^6$)—, —N($R^5$)S($O_2$)N($R^6$), —C($H_2$)C($H_2$)—, —C($H_2$)C(H)(OH)—, —C($H_2$)C(H)(COOR)—, —C($H_2$)C(Me)(COOR)—, and —$C_6H_{10}$(OH)—O—, where R, $R^5$ and $R^6$ are alkyl, aryl, substituted alkyl, substituted aryl, heteroalkyl, heteroaryl or cycloalkyl.

Nanoparticle Examples

In some embodiment, a modified hybrid sol-gel precursor solution includes nanoparticles or, more generally, nanostructures. The nanoparticles may be added to a combination of precursors A, B and C as well as protic and aprotic solvents and form a suspension or dispersion. The nanoparticles are incorporated into the final modified hybrid sol-gel precursor composition. The weight ratio of nanoparticles in a modified hybrid sol-gel precursor solution may be between about 0.8% and 80% by weight or, more specifically, between 5% and 50% by weight or even between about 10% and 30% by weight. The amount of nanoparticles may be determined by application of the modified hybrid sol-gel component among other factors. For example, when a modified hybrid sol-gel component is used as a coating over a substrate subject to large thermal deviations (e.g., semiconductor processing equipment), the component either need to be sufficiently elastic in order to accommodate the coefficient of thermal expansion of the substrate and/or have a comparable coefficient of thermal expansion. In some instances, nanoparticles have substantially different coefficient of thermal expansion than the substrate (e.g., a ceramic containing coating is used over an aluminum substrate). In these instances, the loading of the nanoparticles may be reduced in order to form a more flexible modified hybrid sol-gel component. Furthermore, the larger amounts of the nanoparticles may be too disruptive to sol-gel network.

The size of the nanoparticles may be selected to fit the size of the sol-gel network. In some embodiments, the average principal dimension of the nanoparticles may be between about 1 nanometer to about 20 nanometer or, more specifically, between 2 nanometers and 10 nanometers. This dimension may depend on the selection of precursors A, B, and C described above. Precursors A, B, and C having using larger linking chains may accommodate larger nanoparticles. The nanoparticles may be shaped as a particle (i.e., a one dimensional structure), flake (i.e., a two dimensional structure), or a wire (i.e., a one dimensional structure).

The bulk of nanoparticles are made from materials that do not react with components of a modified hybrid sol-gel precursor solution. These materials generally depend on the application of the resulting modified hybrid sol-gel component. The nanoparticles may be oxides (e.g., silica, alumina, cerum oxide), nitrides (e.g., aluminum nitride, silicon nitride), oxynitride, metals (e.g., aluminum, copper, gold, zinc, silver and the like), synthetic diamond, carbon nanotubes (single or multiwall), and the like. In some embodiments, nanoparticles may be carbon nanoparticles, fullerene nanoparticles, metal oxide powders, metal oxi-nitride particles, and metal halide particles. The nanoparticles may be used to alter various properties (e.g., mechanical properties, electrical properties, optical properties, chemical resistance properties, thermal properties, and the like) of the resulting solid thin film layer. For example, some nitride and oxide nanoparticles increase abrasion resistance and hardness, increase Young's modulus, and decrease the coefficient of thermal expansion. Metallic nanoparticles, such can aluminum, copper, gold, zinc, silver and the like, may be used to increase electrical conductivity.

The nanoparticles can be functionalized, e.g., to form covalent bonds with one or more precursors in the modified hybrid sol-gel precursor solution. For example, nanoparticle surfaces may be plasma, acid, or saturated steam treated. In some embodiments, the treated surface includes hydroxyl groups, amino groups, or some other suitable groups capable of forming covalent bonds within the modified hybrid sol-gel component.

Sol-Gel Formation Examples

Once all precursors are mixed (and deposited on the surface of a substrate), two reactions may take place to form the disclosed modified hybrid sol-gel compositions. One is an inorganic reaction between precursors A and B that forms metal-oxygen or metalloid-oxygen bonds. The other is an organic reaction between precursors B and C involving polymerization of the organic components. The inorganic reaction may be carried out first by controlling thermodynamics and kinetics of the modified hybrid sol-gel precursor solutions. As noted above, a combination of protic and aprotic solvents as well as catalysts may be used for these purposes. During this hydrolysis and condensation step, water is typically formed. The water and solvent may be removed by drying before the polymerization reaction.

The reaction scheme can be reversed such that the organic polymerization takes place first. This embodiment produces a porous composition due to the formation of water or alcohol during the second inorganic reaction that pushes apart the polymer molecules forming the pores. The porosity can be avoided if the condensation reaction is carried out in vacuum or in low vapor pressure of the byproduct, such as water or alcohol, which allows removing the byproduct from the forming layer.

It is also possible to carry out the inorganic and organic reactions simultaneously or to have a temporal overlap between the two reactions. In this manner, the properties of the composition e.g. porosity can be adjusted.

In some embodiments, the modified hybrid sol-gel precursor solution containing precursors A, B and C is mixed with a catalyst such as an acid (e.g., HCl, acetic acid) or base (e.g., secondary and tertiary amine). This causes hydrolysis of the O—R and O—Y bonds in precursors A and B, which facilitates the condensation reaction to form the inorganic portion of the polymer. Inorganic gel formation is also facilitated by the use of polar protic and polar aprotic solvent as discussed infra.

The organic reaction can be catalyzed by heat, acid, base, thermal initiators, photo-initiators or metal catalysts or combinations thereof. The choice of catalyst depends on the first and second cross-linking groups in precursors B and C. Some examples of catalysts include acetic acid, hydrochloric acid, phosphoric acid, nitric acid, sulfuric acid, ammonium hydroxide, and oxalic acid. In some embodiments, acetic acid is used as a catalyst. The concentration of the catalyst in the modified hybrid sol-gel precursor solution may be between about 1% and 10% by volume or, more specifically, between about 2% and 8% by volume, such as between about 4% and 6% by volume.

When heat is used, the temperature of the reaction mixture should be between about 25° C. and 300° C. or, more specifically, between about 80° C. and 200° C. or, more specifically, between about 80° C. and 120° C. Lower temperatures generally result in insufficient rates of reaction (i.e., reactions being too slow) and slow evaporation of solvents used in a modified hybrid sol-gel precursor solution. On the other hand, excessive temperature may cause decomposition of certain components of the modified hybrid sol-gel precursor solution and even of the resulting modified hybrid sol-gel component. Furthermore, excessive temperature may lead to rapid evaporation of solvents and disturbing the sol-gel matrix (e.g., causing excessive porosity) of the modified hybrid sol-gel component.

Examples of thermal initiators include potassium persulfate, peroxides (e.g., benzoyl peroxide, t-butyl peroxide, t-butyl peroxybenzoate), and azo compounds (e.g., AIBN—2,2'-azobisisobutyronitrile, 1,1'-azobis(cyclohexanecarbonitrile, 4,4-bis(4-cyanovaleric acid)). For example, azo compounds are radical initiators that can form radicals by eliminating a molecule of nitrogen gas.

Examples of photo-initiators include acetophenones, benzophenones (e.g., 2,2',4,4'-tetrahydroxybenzophenone), acyl phosphine oxides, alkyl substituted or alkoxy substituted diaryliodonium and triarylsulfonium salts. A photo-initiator decomposes into free radicals when exposed to radiation, e.g., visible light, UV light, microwave light, IR light, and the like.

Solvent Examples

The modified hybrid sol-gel precursor solution, which are sometimes referred to as "solution derived nanocomposite" (SDN) precursor solutions or "precursor solutions" disclosed herein are different from the prior art not only in the use of precursors A, B and C but also in the use of a mixed solvent system. Although a single solvent such as methanol can be used with precursors A, B and C, the solvent is a mixture of (1) a polar protic solvent (e.g., methanol or ethanol) and (2) a polar aprotic solvent (e.g., dimethyl formamide, methyl amine or ethanol amine). By controlling the relative amounts of the protic and aprotic polar solvents and the amount of sol-gel precursors in solution (and other components that may be present) gel formation in the precursor solution can be controlled so that it occurs shortly after application on the surface of a substrate as a thin wet solution. The application technique of the precursor solution causes a sufficient shear force (e.g., through vibration and rotation of the substrate) to cause gel formation. Gel formation may occur at ambient temperatures without the application of heat or radiation.

The sol-gel metal and/or metalloid precursors A and B in the solution are chosen so that the formation of inorganic sol-gel polymers is thermodynamically favored. Without being bound by theory, it is believed that the mixture of polar protic and polar aprotic solvents results in a mixed solvent having an altered polarity (as compared to single solvent systems) that effectively lowers the activation energy for polymer formation by the metal and/or metalloid precursors. If too much polar aprotic solvent is used, the sol-gel precursor solution becomes unstable and can form a gel during its mixing or prior to its application as a solution as a thin film solution. This is undesirable and can result in the clogging of the equipment used for applying the precursor solution. It may also interfere with the formation of a uniform thin layer of precursor solution on the surface of the substrate. The gel formed from such a non-uniform layer will also be non-uniform and will likely contain undesirable defects. On the other hand, if too little polar aprotic solvent is used, the applied precursor solution will not gel in a time efficient manner on the substrate surface. In some embodiments, the weight ratio of the protic solvent and the aprotic solvent is between about 1:1 to 1000:1 or, more specifically, between about 10:1 to 100:1.

In some embodiments, the relative amounts of the metal and/or metalloid precursors A and B and the protic polar and aprotic polar solvents are determined for particular applications. An acid or base catalyst may be used in these determination tests in the amount anticipated for the eventual use of the sol-gel precursor. The catalyst facilitates polymerization of the precursors in the presence of the mixed solvent. Such determinations take into account the amount of shear force to be applied during the application of the precursor solution. In general such shear forces are from about 1 N to about 1000N more typically from about 1 N to about 100N and usually about 1 N to about 10N for the average wet layer thickness. The thickness of such wet layer films can be from about 1 nm to about 1 mm, about 10 nm to about 100 microns, about 10 nm to about 1 micron; about 50 nm to about 1 micron; about 100 nm to about 100 microns and from about 1 micron to about 1 mm. Alternatively, for a particular precursor solution, the shear force needed for appropriate thin film gel formation can be determined and used during the application process.

The time for gel formation after application of the shear force to the sol-gel solution may be between about 1 second and 1000 seconds, about 1 second to 100 seconds, about 1 second to about 10 seconds, about 1 second to less than 5 seconds and about 1 second to about 4 seconds.

The SDN precursor solutions (sometimes referred to as SDN precursor solutions) are typically Non-Newtonian dilatant solutions. As used herein, "dilatant" refers to a solution where the dynamic viscosity increases in a non-linear manner as shear force is increased.

As used herein, the term "gelled thin film", "thin film gel", "sol-gel thin film" or grammatical equivalents means a thin film where the metal and/or metalloid sol-gel precursors A and B in a precursor solution form polymers which are sufficiently large and/or cross linked to form a gel. Such gels typically contain most or all of the original mixed solution and precursor C and have a thickness of about 1 nm to about 10,000 nm, or, more specifically, about 1 nm to about 50,000 nm, or even more specifically about 1 nm to about 5,000 nm and typically about 1 nm to about 500 nm.

Gelled thin films and the precursor solutions used to make them also contain polymerizable moieties on precursors B and C. These moieties are polymerized generally after removal of solvent and formed water.

As used herein, the term "thin film", "sol-gel thin film" or grammatical equivalents means the thin film obtained the solvent is removed from the gelled film and cross-linking has occurred. The solvent can be removed by simple evaporation at ambient temperature, evaporation by exposure to increased temperature of the application of UV, visible or IR radiation. Such conditions also favor continued polymerization of any unreacted or partially reacted metal and/or metalloid precursors A and B as well as precursor C. In some embodiments, 100 vol % of the solvent is removed although in some cases as much as 30 vol % can be retained in the thin gel. Single coat thin films typically have a thickness of between about 1 nm and about 10,000 nm, between about 1 nm and 1,000 nm and about 1 nm and 100 nm. Thin films may have a thickness of 10 nm-100 µm, 10 nm-50 µm, 10 nm-10 µm, 10 nm-1 µm, 2 nm-80 nm, 100 nm-50 µm and 0.1 µm-50 µm.

When more than one coat of precursor composition is applied to form a thin film, the first layer can be allowed to gel and then converted to a thin film. A second coat of the same or a different precursor solution can then be applied and allowed to gel followed by its conversion to a thin film. In an alternate embodiment, the second coat of precursor composition can be applied to the gelled first layer. Thereafter the first and second gelled layers are converted to first and second thin films. Additional layers can be added in a manner similar to the above described approaches.

When one or more polymerization moieties (e.g., initiators) are present, the thin file gel may be exposed to an appropriate initiating condition to promote polymerization of the polymerizable moieties. For example, UV radiation can be used with the above identified photo-inducible initiators.

Solvents can be broadly classified into two categories: polar and non-polar. Generally, the dielectric constant of the solvent provides a rough measure of a solvent's polarity. The strong polarity of water is indicated, at 20° C., by a dielectric constant of 80. Solvents with a dielectric constant of less than 15 are generally considered to be nonpolar. The dielectric constant measures the solvent's ability to reduce the field strength of the electric field surrounding a charged particle immersed in it. This reduction is then compared to the field strength of the charged particle in a vacuum. The dielectric constant of a solvent or mixed solvent as disclosed herein can be thought of as its ability to reduce the solute's internal charge. This is the theoretical basis for the reduction in activation energy discussed above.

Polar solvents, which for purposes of this disclosure are any solvents with a dielectric constant greater than 15, can be further divided into polar protic solvents and polar aprotic solvents. Protic solvents solvate anions strongly via hydrogen bonding. Water is a protic solvent. Aprotic solvents such as acetone or dichloromethane tend to have large dipole moments (separation of partial positive and partial negative charges within the same molecule) and solvate positively charged species via their negative dipole.

Examples of the dielectric constant and dipole moment for some polar protic solvents are presented in Table 1.

TABLE 1

Polar Protic Solvents

| Solvent | Chemical Formula | Boiling point | Dielectric constant | Density | Dipole moment |
|---|---|---|---|---|---|
| Formic acid | H—C(=O)OH | 101° C. | 58 | 1.21 g/ml | 1.41 D |
| n-butanol | $CH_3$—$CH_2$—$CH_2$—$CH_2$—OH | 118° C. | 18 | 0.810 g/ml | 1.63 D |
| Isopropanol (IPA) | $CH_3$—CH(—OH)—$CH_3$ | 82° C. | 18 | 0.785 g/ml | 1.66 D |
| n-Propanol | $CH_3$—$CH_2$—$CH_2$—OH | 97° C. | 20 | 0.803 g/ml | 1.68 D |
| Ethanol (EtOH) | $CH_3$—$CH_2$—OH | 79° C. | 30 | 0.789 g/ml | 1.69 D |
| Methanol (MeOH) | $CH_3$—OH | 65° C. | 33 | 0.791 g/ml | 1.70 D |
| Acetic acid (AcOH) | $CH_3$—C(=O)OH | 118° C. | 6.2 | 1.049 g/ml | 1.74 D |
| Water | H—O—H | 100° C. | 80 | 1.00 g/ml | 1.85 D |

In some embodiments, a polar protic solvent used in a modified hybrid sol-gel precursor solution has a dielectric constant between about 20 and 40. In the same or another embodiment, a polar protic solvent used in a modified hybrid sol-gel precursor solution has a dipole moment between about 1 and 3.

More specific categories of suitable polar protic solvents are organic acids and organic alcohols. For example, formic acid, acetic acid, propionic acid or butyric acid may be used. In some embodiments, acetic acid and/or propionic acid is used as polar protic solvent. Other examples are methyl alcohol, ethyl alcohol, propyl alcohol or butyl alcohol. In some embodiments, methanol and/or ethanol is used as a polar protic solvent. The molecular weight of polar protic solvents or polar aprotic solvents used in a modified hybrid sol-gel precursor solution may be less than 100 g/mol or even less than 60 g/mol. Solvents with lower molecular weight generate fewer unwanted radicals in the precursor solvent.

Examples of the dielectric constant and dipole moment for some aprotic solvents are set forth in Table 2.

TABLE 2

Polar Aprotic Solvents

| Solvent | Chemical Formula | Boiling point | Dielectric constant | Density | Dipole moment |
|---|---|---|---|---|---|
| Dichloromethane | $CH_2Cl_2$ | 40° C. | 9.1 | 1.3266 g/ml | 1.60 D |
| Tetrahydrofuran (THF) | /—$CH_2$—$CH_2$—O—$CH_2$—$CH_2$—\ | 66° C. | 7.5 | 0.886 g/ml | 1.75 D |

TABLE 2-continued

Polar Aprotic Solvents

| Solvent | Chemical Formula | Boiling point | Dielectric constant | Density | Dipole moment |
|---|---|---|---|---|---|
| Rthyl acetate (EtOAc) | $CH_3-C(=O)-O-CH_2-CH_3$ | 77° C. | 6.0 | 0.894 g/ml | 1.78 D |
| Acetone | $CH_3-C(=O)-CH_3$ | 56° C. | 21 | 0.786 g/ml | 2.88 D |
| Dimethylformamide (DMF) | $H-C(=O)N(CH_3)_2$ | 153° C. | 38 | 0.944 g/ml | 3.82 D |
| Acetonitrile (MeCN) | $CH_3-C\equiv N$ | 82° C. | 37 | 0.786 g/ml | 3.92 D |
| Dimethyl sulfoxide (DMSO) | $CH_3-S(=O)-CH_3$ | 189° C. | 47 | 1.092 g/ml | 3.96 D |

In some embodiments, an aprotic solvent used in a modified hybrid sol-gel precursor solution has a dielectric constant between about 5 and 50. As such, both polar and non-polar aprotic solvents may be used. In some embodiments, an aprotic solvent used in a modified hybrid sol-gel precursor solution has a dipole moment between about 2 and 4.

Suitable examples of aprotic solvents include asymmetrical halogenated alkanes, alkyl ether, alkyl esters, ketones, aldehydes, alkyl amides, alkyl amines, alkyl nitriles and alkyl sulfoxides. Specific examples of asymmetrical halogenated alkanes include dichloromethane, 1,2-dichloroethane, 1,2-dichloropropane, 1,3-dichloropropane, 2,2-dichloropropane, dibromomethane, diiodomethane, bromoethane and the like. Specific examples of alkyl ether polar aprotic solvents include tetrahydrofuran, methyl cyanide and acetonitrile. Ketone polar aprotic solvents include acetone, methyl isobutyl ketone, ethyl methyl ketone, and the like. Specific examples of alkyl amide polar aprotic solvents include dimethyl formamide, dimethyl phenylpropionamide, dimethyl chlorobenzamide and dimethyl bromobenzamide and the like. Specific examples Alkyl amine polar aprotic solvents include diethylenetriamine, ethylenediamine, hexamethylenetetramine, dimethylethylenediamine, hexamethylenediamine, tris(2-aminoethyl)amine, ethanolamine, propanolamine, ethyl amine, methyl amine, and (1-2-aminoethyl)piperazine.

In some embodiments, acetonitrile is used as an aprotic solvent. In some embodiments, dimethyl sulfoxide is used as an aprotic solvent. Others examples of suitable alkyl sulfoxides used as aprotic solvents include diethyl sulfoxide and butyl sulfoxide. In some embodiments, hexamethylphosphoramide is used as an aprotic solvent.

Precursor Solution Examples

The total amount of precursors A, B and C in the precursor solution is generally about 1 vol % to 40 vol % when the precursors are a liquid. However, the amount may be from about 5 vol % to about 25 vol % and, more specifically, from about 5 vol % to 15 vol %.

The polar protic solvent makes up most of the mixed solvent in the precursor solution. It is present as measured for the entire volume of the precursor solution at from about 50 vol % to about 90 vol %, more specifically about 50 to about 80 vol % and most specifically about 50-70 vol %. The polar aprotic solvent in the precursor solution is about 1-25 vol % of the solution, more specifically about 1-15 vol % and most specifically about 1-5 vol %.

The application of the precursor solution can be by dip coating, spin coating or a combination of both. Alternatively, the application can be by roll coating or roll to roll coating when flexible substrates are used. Rotation and/or vibration may be applied to the substrate for redistributing a modified hybrid sol-gel precursor solution on the surface of the substrate and/to initiate one or more reactions between components of that solution. In some embodiments, multi-axial rotation may be used. Furthermore, multi-axial vibration may be used in combination with rotation or as a standalone technique.

The use of the disclosed precursor solutions allows for the coating of the surfaces of three dimensional structures using dip coating to form a thin film enveloping the structure. This approach can be supplemented by spinning the coated three dimensional structure Alternatively, a predetermined surface of a structure can be coated with the precursor solution using spin coating or roll coating. In some embodiments, multiple surfaces can be coated by using multiple roll coaters.

When a flat surface is coated, roll coating may be used as a method for applying the precursor solution. Roll coaters can also be used in roll to roll coating of flexible substrates. In either case, the coated surface has an area of at least 50 $cm^2$, at least 100 $cm^2$, at least 1,000 $cm^2$, at least 5,000 $cm^2$, at least 10,000 $cm^2$, at least 15,000 $cm^2$, at least 20,000 $cm^2$ such as at least 25,000 $cm^2$. The upper limit of one dimension of the area coated is to the length of the roll in the roll coater. The length of a roll can be from about 5 or 10 centimeters to about 4 or 5 meters. Accordingly, one dimension of the thin film can also have a length within these ranges. The other dimension is limited by the length of the substrate which can be translated through the roll coater. In a roll to roll application, the second dimension is limited to the length of the flexible substrate. Accordingly, the use of sol-gel precursor solutions in roll coater applications allow the production of thin films with an area of up to about 20 $m^2$, 100 $m^2$, 500 $m^2$ and as much as 1,000 $m^2$ or more. Thus the area of the thin film can range from 50 $cm^2$ to 1,000 $m^2$.

If a single coat of precursor solution is applied, the thin film may be between about 1 nm and about 500 nm thick or, more specifically, between about 1 nm and about 250 nm think, or even between about 1 nm and about 100 nm thick.

Other characteristics of the thin films formed using sol-gel precursors relate to the internal stress in the thin layer and the defect concentration in the thin film. Whereas prior art thin films, such as those made by sputtering, have internal stresses in the range of GPa, thin films as disclosed herein have internal stresses in the range of KPa, e.g. 1000 Pa to less than about 1,000,000 Pa, However, the internal stress in the thin film may be in the MPa range as well. As for defect concentration, prior art thin films, such as those made by sputtering, have defect concentrations between 1.5-2%. Thin films made according to the disclosure herein typically have a defect concentration less than 0.001%, but may be as high as 0.01%, 0.1% or 1.0%. The range of defect concentration is therefore 0.001% or less to about 1.0%.

Embodiment (1)

One example of a modified hybrid sol-gel precursor solution includes precursors A, B, and C, one or more polar protic solvents and one or more polar aprotic solvent. The precursor solution forms a gel after a shear force is applied to said precursor solution. In this case, the precursor solution may be a pseudoplastic fluid or a dilatant fluid.

Embodiment (2)

The precursor solution described may experience the increase in its viscosity as the applied shear force increases.

Embodiment (3)

The precursor solution described above, in which precursor A includes one or more of the following metals: transition metals, lanthanides, actinides, alkaline earth metals, and Group IIIA through Group VA metals.

Embodiment (4)

The precursor solution described above, in which precursor A includes one or more of the following metalloids: boron, silicon, germanium, arsenic, antimony, tellurium, bismuth and polonium.

Embodiment (5)

The precursor solution described above, in which precursor A includes a metallic compound selected from the group consisting of organometallic compounds, metallic organic salts and metallic inorganic salts, any subset of the group or any combination of members of the group or subset of the group. Some examples of organometallic compounds include a metal alkoxide, such as methoxides, ethoxides, propoxides, butoxides and phenoxides. Some examples of organic salts include a metallic organic salt, such as formates, acetates and propionates. Some examples of metal inorganic salts include halides, hydroxides, nitrates, phosphates and sulfates.

Embodiment (6)

The precursor solution described above in which the one or more polar protic solvents are selected from the group consisting of organic acids and organic alcohols. Some examples of organic acids include formic acid, acetic acid, propionic acid and butyric acid. Some examples of organic alcohols include methyl alcohol, ethyl alcohol, propyl alcohol and butyl alcohol.

Embodiment (7)

The precursor solution described above in which polar aprotic solvents may be halogenated alkyl, alkyl ether, alkyl esters, ketones, aldehydes, alkyl amides, alkyl amines, alkyl nitriles and alkyl sulfoxides, any subset of the group or any combination of members of the group or subset of the group. Examples of halogenated alkyl polar aprotic solvents include dichloromethane, 1,2-dichloroethane, 1,2-dichloropropane, 1,3-dichloropropane, 2,2-dichloropropane, dibromomethane, diiodomethane and bromoethane. Examples of ether polar aprotic solvents include tetrahydofuran, methyl cyanide and acetonitrile. Examples of ketone polar aprotic solvents include acetone, methyl isobutyl ketone and ethyl methyl ketone. Examples of alkyl amide polar aprotic solvents include dimethyl formamide, dimethyl phenylpropionamide, dimethyl chlorobenzamide and dimethyl bromobenzamide. Examples of alkyl amine polar aprotic solvents include diethylenetriamine, ethylenediamine, hexamethylenetetramine, dimethylethylenediamine, hexamethylenediamine, tris(2-aminoethyl)amine, ethanolamine, propanolamine, ethyl amine, methyl amine, (1-2-aminoethyl) piperazine. Examples of alkyl nitrile aprotic solvents include acetonitrile. Examples of alkyl sulfoxide aprotic solvents include dimethyl sulfoxide, diethyl sulfoxide and butyl sulfoxide.

Embodiment (8)

The precursor solution of any of the preceding embodiments also including a photo-inducible polymerization catalyst. The photo-inducible polymerization catalyst may be selected from the group consisting of titanocenes, benzophenones/amines, thioxanthones/amines, bezoinethers, acylphosphine oxides, benzilketals, acetophenones, and alkylphenones, any subset of the group or any combination of members of the group or subset of the group.

Embodiment (9)

The precursor solution of any of the preceding embodiments further comprising an acid or base catalyst.

Method for Forming Thin Films Including Modified Hybrid Sol-Gel Composition

Figure 3:
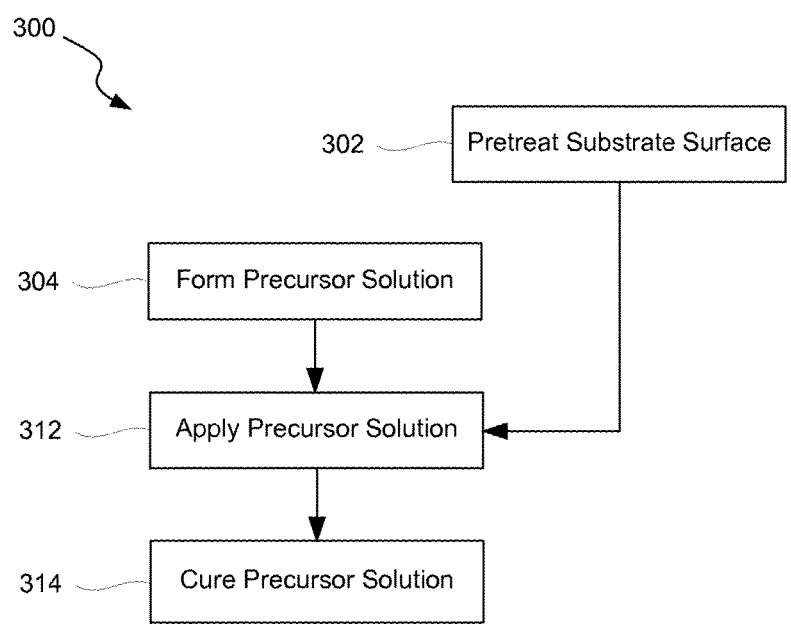
FIG. 3 is a process flowchart corresponding to a method of forming a solid thin film layer from a modified hybrid sol-gel precursor solution, in accordance with some embodiments.

FIG. 3 is a process flowchart corresponding to method 300 of forming a solid thin film layer including a modified hybrid sol-gel composition, in accordance with some embodiments. In some embodiments, method 300 involves pretreating the surface of a substrate during optional operation 302. That surface will later receive a modified hybrid sol-gel precursor solution. The pre-treatment may involve plasma treatment, acid treatment, or saturated steam treated. In some embodiments, the treated surface includes hydroxyl groups, amino groups, or some other suitable groups capable of forming covalent, hydrogen, or some other bonds with the modified hybrid sol-gel compound. The treatment generally depends on the material of the substrate in addition to other factors. For example, a stainless steel substrate may be subjected to acid treatment, while a galvanized steel substrate may be subjected to a steam treatment.

Method 300 may also involve forming a precursor solution from various components during optional operation 304, which may be also referred to as a synthesis process. For example, one or more precursors may be first mixed with one or more solvents. A partial or complete hydrolysis may be completed at this stage. The nanoparticles may be also added into the solution at this point. Some solutions (e.g., water) may be used temporary and evaporated completely or partially during operation 304 and prior to applying the solution onto the substrate during operation 312.

Method 300 may proceed with applying a modified hybrid sol-gel precursor solution onto the surface of a substrate during operation 312. In some embodiments, applying provides sufficient shear force to cause gelation of the precursor solution to form a gelled thin layer. As noted above, the shear force may be applied by subjecting the substrate to vibration and/or rotation.

The precursor solution can be applied by dip coating, spin coating, or a combination of both. Roll coating or roll to roll coating can also be used. The substrate can be metallic, ceramic, or plastic. Metal substrates include aluminum, steel and stainless steel. Ceramic substrates include glass, alumina and sapphire. Plastic substrates include those made from PET, PEN, PE, PP and PVC. Prior to deposition of the precursor solution, the surface of the substrate may be treated using atmospheric plasma or oxygen plasma. For example, a six axis plasma head capable of exposing all or part of the surface of the substrate may be used.

The surface may have a roughness of less than 20 microns or, more specifically, less than 10 microns or even less than 5 microns. The surface roughness directly correlated with the shear stress experienced by the modified hybrid sol-gel precursor solution when the solution is applied to the surface, which may cause cracking of the resulting modified hybrid sol-gel component.

Method 300 may proceed with curing the applied solution during operation 314. For example, the precursor solution or the gelled thin layer to may be exposed to UV radiation, visible radiation, microwave radiation, or infrared radiation. This exposure may cause formation of a solid thin film. Specifically, the exposure may increase in the temperature of gelled thin layer so as to form a crystalline structure.

Examples of Solid Thin Film Layers and Devices Containing these Layers

Figure 2:
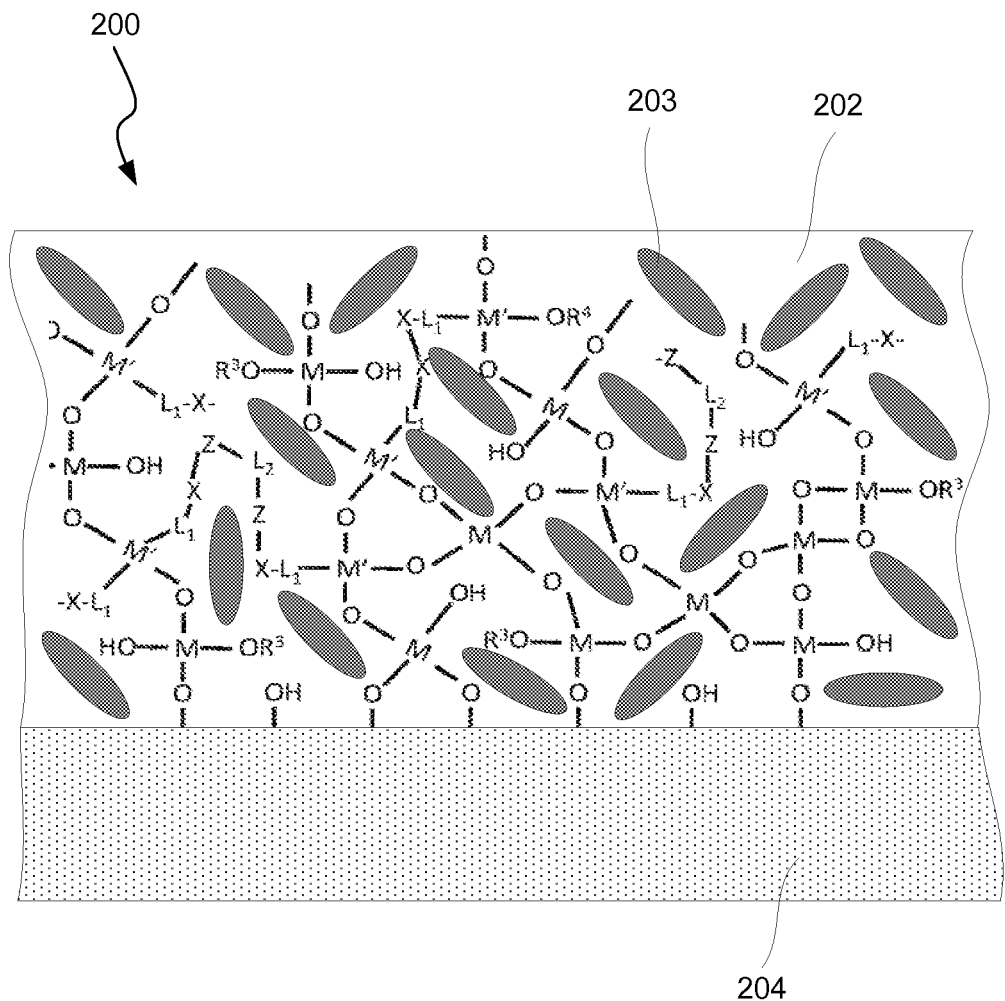
FIG. 2 depicts another assembly including a solid thin film layer formed from a modified hybrid sol-gel precursor solution having nanoparticles and disposed on the surface of a substrate, in accordance with some embodiments.

Examples of solid thin film layers made according to the disclosure herein or as characterized herein are shown in FIGS. 1 and 2. Specifically, FIG. 1 depicts assembly 100 including solid thin film layer 102 formed from a modified hybrid sol-gel precursor solution and disposed on the surface of substrate 104, in accordance with some embodiments. As shown in FIG. 1, precursors of the modified hybrid sol-gel precursor solution form a cross-linked sol-gel network that determine the properties of solid thin film layer 102. FIG. 2 depicts another assembly 200 including solid thin film layer 202 formed from a modified hybrid sol-gel precursor solution having nanoparticles and disposed on the surface of substrate 204, in accordance with some embodiments. These nanoparticles remain solid thin film layer 202 as schematically shown by ovals 203. Specifically, the nanoparticles may be selected to fit into the sol-gel network formed by the precursors of the solution.

In some embodiments, solid thin film layers may be used as transparent conductive oxide (TCO) electrodes, passivating films, back surface field (BSF) layers, diffusion barriers, up-converters, down-converters, selective emitter masks, ion storage layers such as found in lithium ion batteries or electro-chromic devices, solid electrolytes, moisture barriers, abrasion, corrosion, erosion resistive layers, thermal barriers, impedance correction layers, surface modification layers, dielectric thin films, reflective and antireflective layers and the like.

The devices which can contain the thin film include but are not limited to solar cells, especially large area solar cells, electro-chromic glass, low emission glass and ultra thin glass. The surfaces of semiconductor manufacturing equipment can also be coated with the thin films described herein.

Where a range of values is provided above relating to the disclosed and claimed subject matter, it is to be understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Definitions

As used herein, a "modified hybrid sol-gel composition" or grammatical equivalents refers to a composition formed from at least (1) an inorganic precursor, (2) a cross-linkable inorganic-organic precursor, and (3) a cross-linkable organic precursor. A solution containing these three precursors may be referred to a "modified hybrid sol-gel solution." As such, a modified hybrid sol-gel composition is formed from a modified hybrid sol-gel solution. In addition to the three precursors listed above, the solution may include other components, such as protic and aprotic solvents and nanoparticles. Some of these components (e.g., nanoparticles) may remain in resulting modified hybrid sol-gel compositions, while others (e.g., protic and aprotic solvents) may not.

As used herein, an "inorganic precursor" or grammatical equivalents (sometimes referred to as precursor "A") refers to a precursor including a metal or metalloid covalently bonded to two or more hydrolysable groups. Some examples include alkoxide, halides, carbonates, nitrates, sulfates, phosphates, acetates, and hydroxide.

As used herein, a "cross-linkable inorganic-organic precursor" or grammatical equivalents (sometimes referred to as precursor "B") refers to a precursor including a metal covalently bonded to one or more hydrolysable groups and at least one organic molecule. The organic molecule may be hydrolytically stable under the conditions required for sol-gel formation, (e.g., hydrolysis and condensation). In some embodiments, the organic molecule includes at least one cross linking group.

As used herein, a "cross-linkable organic precursor" or grammatical equivalents (sometimes referred to as precursor "C") refers to a precursor having an organic molecule. The organic molecule includes two or more cross linking groups. The cross linking groups in precursor C can be the same or different.

The cross linking groups in precursors B and C are chosen so that upon exposure to polymerization conditions covalent bonds can be generated between (1) precursors B and C, (2) precursors B and B, (3) precursors C and C, and (4) precursors B and A.

"Alkyl" by itself or as part of another substituent, refers to a saturated or unsaturated, branched, straight-chain or cyclic monovalent hydrocarbon radical derived by the removal of one hydrogen atom from a single carbon atom of a parent alkane, alkene or alkyne. Typical alkyl groups include, but are not limited to, methyl; ethyls such as ethanyl, ethenyl, ethynyl; propyls such as propan-I-yl, propan-2-yl, cyclopropan-1-yl, prop-1-en-1-yl, prop-1-en-2-yl, prop-2-en-1-yl (allyl), cycloprop-1-en-1-yl; cycloprop-2-en-1-yl, prop-1-yn-1-yl, prop-2-yn-1-yl, etc.; butyls such as butan-I-yl, butan-2-yl, 2-methyl-propan-1-yl, 2-methyl-propan-2-yl, cyclobutan-I-yl, but-I-en-I-yl, but-1-en-2-yl, 2-methyl-prop-1-en-1-yl, but-2-en-1-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, but-1-yn-1-yl, but-I-yn-3-yl, but-3-yn-1-yl, etc.; and the like.

The term "alkyl" is specifically intended to include groups having any degree or level of saturation, i.e., groups having exclusively single carbon-carbon bonds, groups having one or more double carbon-carbon bonds, groups having one or more triple carbon-carbon bonds and groups having mixtures of single, double and triple carbon-carbon bonds. Where a specific level of saturation is intended, the expressions "alkanyl," "alkenyl," and "alkynyl" are used. In some embodiments, an alkyl group comprises from 1 to 20 carbon atoms. In other embodiments, an alkyl group comprises from 1 to 10 carbon atoms.

"Alkanyl" by itself or as part of another substituent, refers to a saturated branched, straight-chain or cyclic alkyl radical derived by the removal of one hydrogen atom from a single carbon atom of a parent alkane. Typical alkanyl groups include, but are not limited to, methanyl; ethanyl; propanyls such as propan-1-yl, propan-2-yl (isopropyl), cyclopropan-I-yl, etc.; butanyls such as butan-I-yl, butan-2-yl (sec-butyl), 2-methyl-propan-1-yl (isobutyl), 2-methyl-propan-2-yl (t-butyl), cyclobutan-I-yl, etc.; and the like.

"Alkenyl" by itself or as part of another substituent, refers to an unsaturated branched, straight-chain or cyclic alkyl radical having at least one carbon-carbon double bond derived by the removal of one hydrogen atom from a single carbon atom of a parent alkene. The group may be in either the cis or trans conformation about the double bond(s). Typical alkenyl groups include, but are not limited to, ethenyl; propenyls such as prop-I-en-I-yl, prop-1-en-2-yl, prop-2-en-1-yl (allyl), prop-2-en-2-yl, cycloprop-I-en-I-yl, cycloprop-2-en-I-yl; butenyls such as but-1-en-1-yl, but-1-en-2-yl, 2-methyl-prop-1-en-1-yl, but-2-en-1-yl, but-2-en-1-yl, but-2-en-2-yl, buta-1,3-dienI-yl, buta-1,3-dien-2-yl, cyclobut-I-en-I-yl, cyclobut-1-en-3-yl, cyclobuta-1,3-dien-1-yl, etc.; and the like.

"Alkynyl" by itself or as part of another substituent, refers to an unsaturated branched, straight-chain or cyclic alkyl radical having at least one carbon-carbon triple bond derived by the removal of one hydrogen atom from a single carbon atom of a parent alkyne. Typical alkynyl groups include, but are not limited to, ethynyl; propynyls such as prop-1-yn-1-yl, prop-2-yn-1-yl, etc.; butynyls such as but-I-yn-I-yl, but-1-yn-3-yl, but-3-yn-1-yl, etc.; and the like.

"Alkyldiyl" by itself or as part of another substituent, refers to a saturated or unsaturated, branched, straight-chain or cyclic divalent hydrocarbon group derived by the removal of one hydrogen atom from each of two different carbon atoms of a parent alkane, alkene or alkyne, or by the removal of two hydrogen atoms from a single carbon atom of a parent alkane, alkene or alkyne. The two monovalent radical centers or each valency of the divalent radical center can form bonds with the same or different atoms. Typical alkyldiyl groups include, but are not limited to methandiyl; ethyldiyls such as ethan-1,1-diyl, ethan-1,2-diyl, ethen-1,1-diyl, ethen-1,2-diyl; propyldiyls such as propan-1,1-diyl, propan-1,2-diyl, propan-2,2-diyl, propan-1,3-diyl, cyclopropan-1,1-diyl, cyclopropan-1,2-diyl, prop-1-en-1,1-diyl, prop-1-en-1,2-diyl, prop-2-en-1,2-diyl, prop-1-en-1,3-diyl, cycloprop-1-en-1,2-diyl, cycloprop-2-en-1,2-diyl, cycloprop-2-en-1,1-diyl, prop-1-yn-1,3-diyl, etc.; butyldiyls such as, butan-1,1-diyl, butan-1,2-diyl, butan-1,3-diyl, butan-1,4-diyl, butan-2,2-diyl, 2-methylpropan-1,1-diyl, 2-methyl-propan-1,2-diyl, cyclobutan-1,1-diyl; cyclobutan-1,2-diyl, cyclobutan-1,3-diyl, but-1-en-1,1-diyl, but-1-en-1,2-diyl, but-1-en-1,3-diyl, but-1-en-1,4-diyl, 2-methyl-prop-1-en-1,1-diyl, 2-methanylidene-propan-1,1-diyl, buta-1,3-dien-1,1-diyl, buta-1,3-dien-1,2-diyl, buta-1,3-dien-1,3-diyl, buta-1,3-dien-1,4-diyl, cyclobut-1-en-1,2-diyl, cyclobut-1-en-1,3-diyl, cyclobut-2-en-1,2-diyl, cyclobuta-1,3-dien-1,2-diyl, cyclobuta-1,3-dien-1,3-diyl, but-1-yn-1,3-diyl, but-1-yn-1,4-diyl, buta-1,3-diyn-1,4-diyl, etc.; and the like. Where specific levels of saturation are intended, the nomenclature alkanyldiyl, alkenyldiyl and/or alkynyldiyl is used. In some embodiments, the alkyldiyl group is (C1-C20) alkyldiyl. In other embodiments, the alkyldiyl group is (Cr C1o) alkyldiyl. In still other embodiments, the alkyldiyl group is a saturated acyclic alkanyldiyl group in which the radical centers are at the terminal carbons, e.g., methandiyl (methano); ethan-1,2-diyl (ethano); propan-1,3-diyl (propano); butan-1,4-diyl (butano); and the like (also referred to as alkyleno, defined infra).

"Alkyleno" by itself or as part of another substituent, refers to a straight-chain alkyldiyl group having two terminal monovalent radical centers derived by the removal of one hydrogen atom from each of the two terminal carbon atoms of straight-chain parent alkane, alkene or alkyne. Typical alkyleno groups include, but are not limited to, methano; ethylenos such as ethano, etheno, ethyno; propylenos such as propano, prop[1]eno, propa[1,2]dieno, prop[1]yno, etc.; butylenos such as butano, but[l]eno, but[2]eno, buta[1,3]dieno, but[1]yno, but[2]yno, but[1,3]diyno, etc.; and the like. Where specific levels of saturation are intended, the nomenclature alkano, alkeno and/or alkyno is used. In some embodiments, the alkyleno group is (Cr C2o) alkyleno. In other embodiments, the alkyleno group is (Cr C1O) alkyleno. In still other embodiments, the alkyleno group is a straight-chain saturated alkano groups, e.g., methano, ethano, propano, butano, and the like.

"Alkylsulfonyloxy" by itself or as part of another substituent, refers to a radical —OS(O)$_2$R$^{30}$ where R$^{30}$ represents an alkyl or cycloalkyl group as defined herein.

"Alkoxy" by itself or as part of another substituent, refers to a radical —OR$^{31}$ where R$^{31}$ represents an alkyl or cycloalkyl group as defined herein. Representative examples include, but are not limited to, methoxy, ethoxy, propoxy, butoxy, cyclohexyloxy and the like.

"Alkoxycarbonyl" by itself or as part of another substituent, refers to a radical —C(O)OR$^{32}$ where R$^{32}$ represents an alkyl or cycloalkyl group as defined herein.

"Aryl" by itself or as part of another substituent, refers to a monovalent aromatic hydrocarbon radical derived by the removal of one hydrogen atom from a single carbon atom of a parent aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like. In some embodiments, an aryl group comprises from 5 to 20 carbon atoms. In other embodiments, an aryl group comprises from 5 to 12 carbon atoms.

"Aryldiyl" by itself or as part of another substituent refers to a divalent hydrocarbon radical derived by the removal of one hydrogen atom from each of two different carbon atoms of a parent aromatic system or by removal of two hydrogen atoms from a single carbon atom of a parent aromatic ring system. The two monovalent radical centers or each valency of the divalent center can form bonds with the same or different atom(s). Typical aryldiyl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like. In some embodiments, an aryldiyl group comprises from 5 to 20 carbon atoms. In other embodiments, an aryldiyl group comprises from 5 to 12 carbon atoms.

"Aryloxycarbonyl" by itself or as part of another substituent, refers to a radical —C(O)OR$^{33}$ where R$^{33}$ represents an aryl group as defined herein.

"Arylsulfonyloxy" by itself or as part of another substituent, refers to a radical —OS(O)$_2$R$^{35}$ where R$^{35}$ represents an alkyl or cycloalkyl group as defined herein.

"Cycloalkyl" by itself or as part of another substituent, refers to a saturated or unsaturated cyclic alkyl radical. Where a specific level of saturation is intended, the nomenclature "cycloalkanyl" or "cycloalkenyl" is used. Typical cycloalkyl groups include, but are not limited to, groups derived from cyclopropane, cyclobutane, cyclopentane, cyclohexane and the like. In some embodiments, the cycloalkyl group is (C3-C10) cycloalkyl. In other embodiments, the cycloalkyl group is (C3-C7) cycloalkyl. "Heteroalkyl, Heteroalkanyl, Heteroalkenyl, Heteroalkanyl, Heteroalkyldiyl and Heteroalkyleno" by themselves or as part of another substituent, refer to alkyl, alkanyl, alkenyl, alkynyl, alkyldiyl and alkyleno groups, respectively, in which one or more of the carbon atoms (and any associated hydrogen atoms) are each independently replaced with the same or different heteroatomic groups. Typical heteroatomic groups which can be included in these groups include, but are not limited to, —O—, —S—, —O—O—, —S—S—, —O—S—, —NR$^{35}$R$^{36}$—, =N—N=, —N=N—, —N=N—NR$^{37}$R$^{38}$, —PR$^{39}$—, —P(O)$_2$—, —POR$^{40}$—, —O—P(O)$_2$—, —SO—, —SO$_2$—, —SnR$^{41}$R$^{42}$— and the like, where R$^{35}$, R$^{36}$, R$^{37}$, R$^{38}$, R$^{39}$, R$^{40}$, R$^{41}$ and R$^{42}$ are independently hydrogen, alkyl, substituted alkyl, aryl, substituted aryl, arylalkyl, substituted arylalkyl, cycloalkyl, substituted cycloalkyl, cycloheteroalkyl, substituted cycloheteroalkyl, heteroalkyl, substituted heteroalkyl, heteroaryl, substituted heteroaryl, heteroarylalkyl or substituted heteroarylalkyl.

"Heteroaryl" by itself or as part of another substituent, refers to a monovalent heteroaromatic radical derived by the removal of one hydrogen atom from a single atom of a parent heteroaromatic ring system. Typical heteroaryl groups include, but are not limited to, groups derived from acridine, arsindole, carbazole, 13-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In some embodiments, the heteroaryl group is from 5-20 membered heteroaryl. In other embodiments, the heteroaryl group is from 5-10 membered heteroaryl. In still other embodiments, the heteroaryl groups are those derived from thiophene, pyrrole, benzothiophene, benzofuran, indole, pyridine, quinoline, imidazole, oxazole and pyrazine.

"Heteroaryldiyl" by itself or as part of another substituent refers to a divalent radical derived by the removal of one hydrogen atom from each of two different carbon atoms of a parent heteroaromatic system or by removal of two hydrogen atoms from a single carbon atom of a parent aromatic ring system. The two monovalent radical centers or each valency of the divalent center can form bonds with the same or different atom(s). Typical heteroaryldiyl groups include, but are not limited to, groups derived from acridinc, arsindole, carbazole, J3-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In some embodiments, a heteroaryldiyl group comprises from 5 to 20 carbon atoms. In other embodiments, a heteroaryldiyl group comprises from 5 to 12 carbon atoms.

"Parent Aromatic Ring System" by itself or as part of another substituent, refers to an unsaturated cyclic or polycyclic ring system having a conjugated TT electron system. Specifically included within the definition of "parent aromatic ring system" are fused ring systems in which one or more of the rings are aromatic and one or more of the rings are saturated or unsaturated, such as, for example, fluorene, indane, indene, phenalene, etc. Typical parent aromatic ring systems include, but are not limited to, aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like.

"Parent Heteroaromatic Ring System" by itself or as part of another substituent, refers to a parent aromatic ring system in which one or more carbon atoms (and any associated hydrogen atoms) are independently replaced with the same or different heteroatom. Typical heteroatoms to replace the carbon atoms include, but are not limited to, N, P, O, S, Si, etc. Specifically included within the definition of "parent heteroaromatic ring systems" are fused ring systems in which one or more of the rings are aromatic and one or more of the rings are saturated or unsaturated, such as, for example, arsindole, benzodioxan, benzofuran, chromane, chromene, indole, indoline, xanthene, etc. Typical parent heteroaromatic ring systems include, but are not limited to, arsindole, carbazole, P-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophenc, triazole, xanthene, and the like.

"Substituted" refers to a group in which one or more hydrogen atoms are independently replaced with the same or different substituent(s). Typical substituents include, but are not limited to, -M, —R$^{60}$, —O—, =O, —OR$^{60}$, —SR$^{60}$, —SO, =S5-NR$_{60}$R$^{61}$, =NR$^{60}$, —CF$^3$, —CN, —OCN, —SCN, —NO, —NO$_2$, =N$_2$, —N$^3$, —S(O)$_2$O—, S(O)$_2$R$^{60}$, —OS(O)$_2$R$^{60}$, —P(O)(O)$_2$, —P(O)(OR$^{60}$)(O—), —OP(O)(OR$^{60}$)(OR$^{61}$), —C(o)R$^{60}$, —C(O)R$^{60}$, —C(S)R$^{60}$, —C(O)OR$^{60}$, —C(O)NR$^{60}$R$^{61}$, —C(O)O—, —C(S)OR$^{60}$R$^{61}$, —NR$^{62}$C(S)NR$^{60}$R$^{61}$, —NR$^{62}$C(NR$^{63}$)NR$^{60}$R$^{61}$ and —C(NR$^{62}$)NR$^{60}$R$^{61}$ where M is independently a halogen; R$^{60}$, R$^{61}$, R$^{62}$ and R$^{63}$ are independently hydrogen, alkyl, substituted alkyl, alkoxy, substituted alkoxy, cycloalkyl, substituted cycloalkyl, cycloheteroalkyl, substituted cycloheteroalkyl, aryl, substituted aryl, heteroaryl or substituted heteroaryl, or optionally $R^{60}$ and $R^{61}$ together with the nitrogen atom to which they are bonded form a cycloheteroalkyl or substituted cycloheteroalkyl ring; and $R^{64}$ and $R^{65}$ are independently hydrogen, alkyl, substituted alkyl, aryl, cycloalkyl, substituted cycloalkyl, cycloheteroalkyl, substituted cycloheteroalkyl, aryl, substituted aryl, heteroaryl or substituted heteroaryl, or optionally $R^{64}$ and $R^{65}$ together with the nitrogen atom to which they are bonded form a cycloheteroalkyl or substituted cycloheteroalkyl ring. In some embodiments, substituents include, —M, —$R^{60}$, —O—, =O, —$OR^{60}$, —$SR^{60}$, —SO, =S5-$NR_{60}R^{61}$, =$NR^{60}$, —$CF^3$, —CN, —OCN, —SCN, —NO, —$NO_2$, =$N_2$, —$N^3$, —$S(O)_2O$—, $S(O)_2R^{60}$, —$OS(O)_2R^{60}$, —$P(O)(O—)_2$, —$P(O)(OR^{60})(O—)$, —$OP(O)(OR^{60})(OR^{61})$, —$C(O)R^{60}$, —$C(O)R^{60}$, —$C(S)R^{60}$, —$C(O)OR^{60}$, —$C(O)NR^{60}R^{61}$, —$C(O)O$—, —$C(S)OR^{60}$, —$NR^{62}C(O)NR^{60}R^{61}$, —$NR^{62}C(S)NR^{60}R^{61}$, —$NR^{62}C(NR^{63})NR^{60}R^{61}$ and —$C(NR^{62})NR^{60}R^{61}$ or, more specifically, —M, —$R^{60}$, =O, —$OR^{60}$, —$SR^{60}$, —$NR_{60}R^{61}$, —$CF^3$, —CN, —$NO_2$, —$S(O)_2R^{60}$—) $OP(O)(OR^{60})(OR^{61})$, —$C(O)R^{60}$, —$C(O)OR^{60}$, —$C(O)NR^{60}R^{61}$, —$C(O)O$— or, even more specifically, —M, —$R^{60}$, =O, —$OR^{60}$, —$SR^{60}$, —$NR_{60}R^{61}$, —$CF^3$, —CN, —$NO_2$, —$S(O)_2R^{60}$, —$OP(O)(OR^{60})(OR^{61})$, —$C(O)R^{60}$, —$C(O)OR^{60}$, —$C(O)O$—, where $R^{60}$, $R^{61}$ and $R^{62}$ are a defined above.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A modified hybrid sol-gel precursor solution comprising
    an inorganic precursor comprising two or more first hydrolysable groups and one of a first metal or a first metalloid,
        wherein the one of the first metal or the first metalloid is covalently bonded to the two or more first hydrolysable groups;
    a cross-linkable inorganic-organic precursor comprising a second metal, a second hydrolysable group, and a first organic molecule,
        wherein the second metal is covalently bound to the second hydrolysable group and is covalently bound to the first organic molecule,
        wherein the first organic molecule comprises a first cross-linking group;
    a cross-linkable organic precursor comprising a second organic molecule,
        wherein the second organic molecule comprises two or more second cross-linking groups;
    a protic solvent; and
    an aprotic solvent,
        wherein a weight ratio of the protic solvent and the aprotic solvent in the modified hybrid sol-gel precursor solution is selected to achieve a gelation rate of the inorganic precursor, the cross-linkable inorganic-organic precursor, and the cross-linkable organic precursor,
    wherein the first metalloid is selected from the group consisting of boron, germanium, arsenic, antimony, tellurium, bismuth, and polonium, and
    wherein the first metal is selected from the group consisting of transition metals, lanthanides, actinides, alkaline earth metals, and Group IIIA through Group VA metals.

2. The modified hybrid sol-gel precursor solution of claim 1, wherein the inorganic precursor has structural Formula (I):

$$M\text{-}(O\text{—}R^1)_e \qquad (I)$$

where
M is the first metal or the first metalloid,
(O—$R^1$) or U is one of the two or more first hydrolysable groups such that
e is 2-6,
O is oxygen,
$R^1$ is one of alkyl, substituted alkyl, or heteroalkyl, and.

3. The modified hybrid sol-gel precursor solution of claim 1, wherein the cross-linkable inorganic-organic precursor is represented by structural Formula (II):

$$\text{—}(U\text{-}L_1)_f\text{-}M'\text{-}(O\text{—}R^2)_g\text{—} \qquad (II)$$

where
M' is the second metal selected from the group consisting of Si, Ge, and Sn,
(U-$L_1$) is the first organic molecule such that
f is 1 or 2,
U is the first cross-linking group, and
$L_1$ is one of alkyldiyl, substituted alkydiyl, fluoroalkydiyl, or heteroalkydiyl,
(O—$R^2$) is the second hydrolysable group such that
g is 2-5,
O is oxygen, and
$R^2$ is an alkyl, substituted alkyl, or heteroalkyl.

4. The modified hybrid sol-gel precursor solution of claim 3, wherein U is one of a bond, —O—, —$N(R^5)$—, —N(H)—, —S—, —S—S—, $C(O)N(R^5)$—, —$N(R^5)C(O)$—, —$N(R^5)S(O_2)$—, —$S(O)_2N(R^5)$—, —OC(O)—, —$OC(O)N(R^5)$—, —$N(R^5)C(O)O$—, —$N(R^5)C(O)N(R^6)$—, —$N(R^5)S(O_2)N(R^6)$, —$C(H_2)C(H_2)$—, —$C(H_2)C(H)(OH)$—, —$C(H_2)C(H)(COOR)$—, —$C(H_2)C(Me)(COOR)$—, and —$C_6H_{10}(OH)$—O—, wherein each one of R, $R^5$ and $R^6$ is one of an alkyl, an aryl, a substituted alkyl, a substituted aryl, a heteroalkyl, a heteroaryl, or a cycloalkyl.

5. The modified hybrid sol-gel precursor solution of claim 1, wherein the cross-linkable organic precursor is represented by structural Formula (III):

$$\text{—}V\text{-}L_2\text{-}(V)_h\text{—} \qquad (III)$$

where
V-$L_2$-$(V)_h$ is the second organic molecule,
$L_2$ is one of alkyl, substituted alky, heteroalkyl, cycloalkyl, silsesquioxane, or polydimethysiloxane,
V is one of the two or more second cross-linking groups such that h is 1-7.

6. The modified hybrid sol-gel precursor solution of claim 5, wherein V is one of a bond, —O—, —$N(R^5)$—, —N(H)—, —S—, —S—S—, $C(O)N(R^5)$—, —$N(R^5)C(O)$—, —$N(R^5)S(O_2)$—, —$S(O)_2N(R^5)$—, —OC(O)—, —$OC(O)N(R^5)$—, —$N(R^5)C(O)O$—, —$N(R^5)C(O)N(R^6)$—, —$N(R^5)S(O_2)N(R^6)$, —$C(H_2)C(H_2)$—, —$C(H_2)C$ (H)(OH)—, —C(H₂)C(H)(COOR)—, —C(H₂)C(Me)(COOR)—, and —C₆H₁₀(OH)—O—, wherein each one of R, $R^5$ and $R^6$ is one of an alkyl, an aryl, a substituted alkyl, a substituted aryl, a heteroalkyl, a heteroaryl, or a cycloalkyl.

7. The modified hybrid sol-gel precursor solution of claim 1, wherein the protic solvent is selected from the group of propanol and acetic acid.

8. The modified hybrid sol-gel precursor solution of claim 1, wherein the aprotic solvent is selected from the group of dimethylformamide (DMF), acetonitrile (MeCN), tetrahydrofuran (THF), and rthyl acetate (EtOAc).

9. The modified hybrid sol-gel precursor solution of claim 1, wherein each of the protic solvent and the aprotic solvent has a molecular weight less than 100 g/mol.

10. The modified hybrid sol-gel precursor solution of claim 1, wherein a weight ratio of the protic solvent and the aprotic solvent is between about 1:1 to 1000:1.

11. The modified hybrid sol-gel precursor solution of claim 1, wherein a weight ratio of the protic solvent and the aprotic solvent is between about 10:1 to 100:1.

12. The modified hybrid sol-gel precursor solution of claim 1, further comprising an additional protic solvent different from the protic solvent.

13. The modified hybrid sol-gel precursor solution of claim 1, further comprising nanoparticles.

14. The modified hybrid sol-gel precursor solution of claim 13, wherein the nanoparticles have functionalized surfaces configured to form covalent bonds with one or more of the inorganic precursor, the cross-linkable inorganic-organic precursor, or the cross-linkable organic precursor.

15. The modified hybrid sol-gel precursor solution of claim 14, wherein the functionalized surfaces of the nanoparticles are plasma treated surfaces.

16. The modified hybrid sol-gel precursor solution of claim 13, wherein the nanoparticles are selected from the group consisting of carbon nanoparticles, fullerene nanoparticles, metal oxi-nitride particles, and metal halide particles.

17. The modified hybrid sol-gel precursor solution of claim 13, wherein the nanoparticles have an average size of between about 1 nanometer to about 20 nanometers.

18. A method of forming a solid thin film layer, the method comprising:
  applying a modified hybrid sol-gel precursor solution onto a surface of a substrate,
    the modified hybrid sol-gel precursor solution comprising:
      an inorganic precursor comprising two or more first hydrolysable groups and one of a first metal or a first metalloid,
        wherein the one of the first metal or the first metalloid is covalently bonded to the two or more first hydrolysable groups;
      a cross-linkable inorganic-organic precursor comprising a second metal, a second hydrolysable group, and a first organic molecule,
        wherein the second metal is covalently bound to the second hydrolysable group and is covalently bound to the first organic molecule,
        wherein the first organic molecule comprises a first cross-linking group;
      a cross-linkable organic precursor comprising a second organic molecule,
        wherein the second organic molecule comprises two or more second cross-linking groups;
      a protic solvent; and
      an aprotic solvent,
        wherein a weight ratio of the protic solvent and the aprotic solvent in the modified hybrid sol-gel precursor solution is selected to achieve a gelation rate of the inorganic precursor, the cross-linkable inorganic-organic precursor, and the cross-linkable organic precursor; and
  curing the modified hybrid sol-gel precursor solution on the surface thereby forming the solid thin film layer
  wherein the first metalloid is selected from the group consisting of boron, germanium, arsenic, antimony, tellurium, bismuth, and polonium, and
  wherein the first metal is selected from the group consisting of transition metals, lanthanides, actinides, alkaline earth metals, and Group IIIA through Group VA metals.

* * * * *